United States Patent
Abdul Kareem et al.

(10) Patent No.: US 11,686,833 B2
(45) Date of Patent: Jun. 27, 2023

(54) METHOD FOR RADAR RANGING AND TRANSCEIVER THEREFOR

(71) Applicant: NXP B.V., Eindhoven (NL)

(72) Inventors: Abdul Wahid Abdul Kareem, Irvine, CA (US); Radha Srinivasan, Irvine, CA (US); Brima Babatunde Ibrahim, Laguna Hills, CA (US)

(73) Assignee: NXP B.V., Eindhoven (NL)

(*) Notice: Subject to any disclaimer, the term of this patent is extended or adjusted under 35 U.S.C. 154(b) by 253 days.

(21) Appl. No.: 17/082,104

(22) Filed: Oct. 28, 2020

(65) Prior Publication Data
US 2022/0128678 A1 Apr. 28, 2022

(51) Int. Cl.
*G01S 13/10* (2006.01)
*H04B 1/7163* (2011.01)
(Continued)

(52) U.S. Cl.
CPC .......... *G01S 13/106* (2013.01); *G01S 7/024* (2013.01); *G01S 7/038* (2013.01);
(Continued)

(58) Field of Classification Search
None
See application file for complete search history.

(56) References Cited

U.S. PATENT DOCUMENTS

2012/0230369 A1* 9/2012 Zhang .................. H04B 1/7183
375/E1.001
2013/0050011 A1  2/2013 Kim
(Continued)

FOREIGN PATENT DOCUMENTS

KR       102051855 B1    7/2019
WO     2020/160160 A1    8/2020

OTHER PUBLICATIONS

IEEE Standards Association 802.15.4z™ 2020: IEEE Standard for Low Rate Wireless Networks; Amendment 1: Enhanced Ultra Wideband (UWB) Physical Layers (PHYs) and Associated Ranging Techniques; Approved Jun. 4, 2020.
(Continued)

*Primary Examiner* — Whitney Moore
(74) *Attorney, Agent, or Firm* — Daniel D. Hill

(57) ABSTRACT

A method is provided for radar ranging using an IR-UWB radar transceiver. The range is determined by measuring a time required by a transmitted pulse to be reflected by an object and returned to the transceiver. The method includes transmitting a ranging signal having a predetermined sequence of positive and negative pulses using a transmitter of the transceiver. A receiver of the transceiver receives a signal having a reflected portion and a feedthrough portion. In the method, the receiver cancels the feedthrough portion using a delayed pulse polarity signal such that when the delayed pulse polarity signal is multiplied and accumulated with the received signal, the feedthrough portion is canceled, and the reflected portion is amplified. In another embodiment, a transceiver is provided that cancels the feedthrough portion while amplifying the reflected portion. Cancelling the feedthrough portion allows short-range operation by removing a blind range of the transceiver.

16 Claims, 3 Drawing Sheets

(51) Int. Cl.
  *G01S 7/02* (2006.01)
  *G01S 7/03* (2006.01)
  *G01S 13/02* (2006.01)
(52) U.S. Cl.
  CPC ...... *G01S 13/0209* (2013.01); *H04B 1/71632* (2013.01); *H04B 2201/71634* (2013.01)

(56) References Cited

U.S. PATENT DOCUMENTS

| | | |
|---|---|---|
| 2013/0278455 A1 | 10/2013 | Song |
| 2014/0292563 A1 | 10/2014 | Palmer et al. |
| 2015/0200706 A1* | 7/2015 | Bottazzi ............... H04B 1/7073 375/140 |
| 2020/0003881 A1* | 1/2020 | Hjortland ................ G01S 7/282 |

OTHER PUBLICATIONS

Magoon, Stephen G. "A Compact Ultra Wide-Band Radar System for See-Through Wall Applications;" Masters Thesis, The University of Tennessee Knoxville; Tennessee Research and Creative Exchange (TRACE); Dec. 2013.

Pannuto, Pat et al.; "Harmonium: Ultra Wideband Pulse Generation with Bandstitched Recovery for Fast, Accurate, and Robust indoor Localization;" ACM Transactions on Sensor Networks, vol. 14, No. 2, Article 11; Publication date Jun. 2018; https://doi.org/10.1145/3185752.

Venkatakrishnan, Satheesh Bojja et al.; "Wideband RF Self-Interference Cancellation Circuit for Phased Array Simultaneous Transmit and Receive Systems;" IEEE Access, vol. 6, 2018; Date of Publication Jan. 3, 2018 and date of current version Feb. 28, 2018.

\* cited by examiner

METHOD FOR RADAR RANGING AND TRANSCEIVER THEREFOR

BACKGROUND

Field

This disclosure relates generally to radar, and more specifically, to a method for radar ranging and transceiver therefor.

Related Art

An Impulse Radio Ultra-Wideband (IR-UWB) system may be used for ranging, or distance measuring, by measuring the Time-of-Flight (ToF) of a signal between two devices. For precise ranging between two devices, the two devices communicate with each other and calculate the amount of time required for a signal to reach the other device. An IR-UWB radar system can also be used for ranging with a single device and passive reflection from objects. The principles of an IR-UWB radar is similar to ranging between two devices except that the distance is now calculated using the total time taken for the signal to travel from the transmitter of the device to an object, and then reflected back from the object to the receiver of the same device. IR-UWB) technology as set out in IEEE standard 802.15.4z is used for indoor ranging and localization applications and IR-UWB devices operate in a frequency range of approximately 3 GHz to 10 GHz to provide relatively low-cost and low-complexity ranging. This type of ranging device has a wide range of applications. For example, this type of ranging device can be used for detecting objects for applications like detecting a human presence, movement of people in a room, or medical applications such as detecting breathing.

In a radar transceiver, the receiver may be unable to detect a reflected signal during the time when a pulse is transmitted due to the high feedthrough power from transmitter to receiver. This creates a blind range for the transceiver which is generally equal to the width of the transmitted pulse. For long-range traditional radars, this blind range is not an issue because it is not in the region of interest for those longer-range applications. That is, the receiver is not blind during a time when a reflected signal is received. However, for shorter-range UWB radars, there may be significant coupling from a transmitter to a receiver in the device. This causes the received signal to be dominated by a feedthrough signal via the coupled path for approximately the duration of the transmitted pulse. Hence, this restricts the minimum distance that can be detected by the system which is typically not desirable for many short-range applications.

Therefore, a need exists for a transceiver and a method for ranging that overcomes at least some of the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
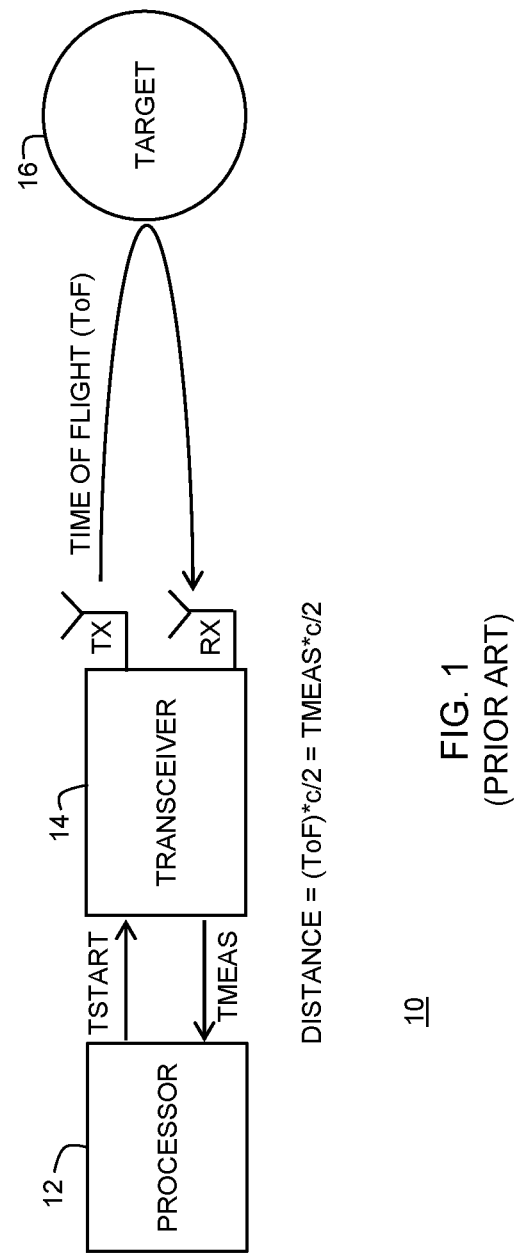
FIG. 1 illustrates ranging in an IR-UWB radar system.

Generally, there is provided, a method for determining a distance between a IR-UWB radar transceiver and an object. In one embodiment, the measured distances are relatively short. The transceiver includes a transmitter connected to a transmit antenna, and a receiver connected to a receive antenna. In the method, a ranging signal is transmitted by the transmitter that has a predetermined sequence of positive and negative pulses. When the ranging signal hits an object, a reflected portion of the ranging signal is reflected back to a receiver in the transceiver. In addition to the reflected portion, an undesired feedthrough portion of the ranging signal may be coupled between the transmitter and the receiver. The feedthrough portion may overpower the reflected portion creating a blind range for the receiver with respect to the reflected portion. To remove or suppress the feedthrough portion, the ranging signal having the predetermined sequence of positive and negative pulses is transmitted by the transmitter. The predetermined sequence includes an equal number of positive and negative pulses. When the sequence is transmitted, a pulse polarity signal is communicated from the transmitter to the receiver. The pulse polarity signal indicates to the receiver the polarity of each pulse as it is transmitted. The pulse polarity signal is then used in a digital part of the receiver to digitally cancel the feedthrough portion while also amplifying the reflected portion.

Specifically, in one embodiment, the pulse polarity signal is a single bit signal. The pulse polarity signal is provided to a multiplexer to select either a positive state or a negative state corresponding to each pulse of the transmitted ranging signal. The sequence of states is then multiplied with the sequence of transmitted pulses. The pulse polarity signal is delayed by a time period selected to cause a previous state of the pulse polarity signal to be multiplied with a current pulse of the feedthrough portion. The delay is determined so that only the feedthrough portion is covered by the delay and not the reflected portion of the received signal. For the reflected portion, the current state pulse polarity signal is multiplied with the current state of the reflected portion. The multiplication result is then accumulated. Because of the equal number of transmitted positive and negative pulses, the feedthrough portion is canceled while the reflected portion is amplified.

Canceling the feedthrough signal removes the described blind range problem described above for short range distance measuring using an IR-UWB radar.

In accordance with an embodiment, there is provided, a method for radar ranging, the method including: transmitting, by a transmitter of a transceiver, a signal having a first predetermined sequence of positive and negative pulses; receiving, by a receiver of the transceiver, a reflected portion of the transmitted signal from an object; receiving, by the receiver, a feedthrough portion of the transmitted signal via a coupled path between the transmitter and the receiver; providing a pulse polarity signal from the transmitter to the receiver, the pulse polarity signal representative of the predetermined sequence of positive and negative states for indicating the polarity of each transmitted pulse of the transmitted signal; delaying the pulse polarity signal by a predetermined delay to provide a delayed pulse polarity signal to the receiver; using the delayed pulse polarity signal to provide a delayed sequence of positive and negative pulse polarity states; multiplying each pulse polarity state in the delayed sequence of pulse polarity states with a pulse corresponding pulse of the feedthrough portion of the transmitted signal to produce a multiplication result having a plurality of positive and negative pulses, wherein the delay of the delayed pulse polarity signal shifts each multiplication into next a pulse repetition interval (PRI); and accumulating the positive and negative pulses of the multiplication result, wherein the predetermined sequence of the positive and negative pulses is predetermined to suppress the feedthrough ranging signal received via the coupled path. The predetermined sequence of positive and negative pulses of the transmitted signal may have an equal number of positive and negative pulses. Delaying the pulse polarity signal by a predetermined delay may further include delaying the pulse polarity signal by a time period determined so that a state of the delayed pulse polarity state signal is multiplied with only the feedthrough portion of a next transmitted pulse. The delay may be determined to include each whole pulse of the feedthrough portion of the transmitted signal without including the reflected portion. The transceiver may be an impulse radio ultra-wideband (IR-UWB) radar frequency transceiver used for ranging. The reflected portion of the transmitted signal may be received within a time period when the transmitted signal is still being transmitted by the transmitter. Accumulating the positive and negative pulses of the multiplication result may cancel the feedthrough ranging signal as viewed in a channel impulse response of the received feedthrough portion and the reflected portion of the transmitted signal. Accumulating the positive and negative pulses of the feedthrough portion of the ranging signal may occur during binning. The delayed pulse polarity state signal may be a digital signal and may be provided to select the positive and negative pulses.

In another embodiment, there is provided, in an impulse radio ultra-wideband (IR-UWB) radar transceiver having a transmitter and a receiver, a method for radar ranging, the method including: transmitting, by the transmitter, a ranging signal having a predetermined sequence of positive and negative pulses; receiving, by the receiver, a received signal having a reflected portion of the ranging signal and a feedthrough portion of the ranging signal, wherein the feedthrough portion is received via a coupled path between the transmitter and the receiver; providing a pulse polarity state signal to the receiver, the pulse polarity state signal representative of the transmitted ranging signal, the pulse polarity state signal; multiplying each current pulse in the predetermined sequence of the feedthrough portion of the ranging signal with a previous state of the pulse polarity state signal to produce a multiplication result having a plurality of positive and negative pulses; and accumulating the positive and negative pulses of the multiplication result, wherein the transmitted sequence of positive and negative pulses comprises an equal number of positive and negative pulses that are predetermined to suppress the feedthrough ranging signal received via the coupled path. The ranging signal may be divided into a plurality of pulse repetition intervals (PRI), wherein each pulse of the predetermined sequence of positive and negative pulses occupies one PRI, and wherein the previous state is in a PRI prior to the current pulse. Delaying the pulse polarity state signal by a predetermined delay may further include delaying the pulse polarity signal by a time period determined so that a state of the delayed pulse polarity state signal is multiplied with only the feedthrough portion of a next transmitted pulse. The delay may be determined to include each whole pulse of the feedthrough portion of the ranging signal without including the reflected portion. The reflected portion of the ranging signal may be received within a time period when the ranging signal is still being transmitted by the transmitter. Accumulating the positive and negative pulses of the multiplication result may suppress the feedthrough portion of the ranging signal as viewed in a channel impulse response of the received feedthrough portion and reflected portion of the transmitted signal. The delayed pulse polarity signal may be a digital signal and is provided to select the positive and negative pulses.

In yet another embodiment, there is provided, a transceiver including: a transmitter configured to transmit a plurality of pulses, via a transmit antenna, the plurality of pulse including a predetermined sequence of positive and negative pulses, wherein the transmitter is configured to transmit a pulse polarity signal to the receiver, the pulse polarity signal indicating a polarity of each transmitted pulse of the plurality of pulses; a delay element having an input coupled to receive the pulse polarity signal, and an output for providing a delayed pulse polarity signal; a receiver configured to receive the predetermined sequence of positive and negative pulses from the transmitter, via a receive antenna, each pulse of the predetermined sequence including a reflected portion and a feedthrough portion, wherein the reflected portion is reflected from a target object and the feedthrough portion is received via a coupled path between the transmitter and the receiver, wherein the receiver is configured to multiply each pulse of the feedthrough portion with a positive one or negative one state as determined by the delayed pulse polarity signal to produce a multiplication result having a plurality of positive and negative pulses, and wherein the receiver is configured to accumulate the positive and negative pulses of the multiplication result, the accumulated positive and negative pulses are predetermined to suppress the feedthrough portion of the plurality of pulses. The transceiver may be an impulse radio ultra-wideband (IR-UWB) radar transceiver. The predetermined sequence of positive and negative pulses may include an equal number of positive and negative pulses. The delayed pulse polarity signal may further include the pulse polarity signal being delayed by a time period determined so that a state of the delayed pulse polarity signal is multiplied with only the feedthrough portion of a next transmitted pulse.

FIG. 1 illustrates ranging in a simplified IR-UWB radar system 10. In radar system 10, transceiver 14 includes a transmitter and a receiver, each connected to an antenna. The transmitter transmits a signal from a transmit antenna (TX). The signal is reflected from target object 16, and the reflected portion of the signal is received by the receiver of the transceiver via a receive antenna (RX). The time required for the signal to make the round trip, labeled TMEAS, is provided to processor 12. Time TMEAS is measured from a start time TSTART from processor 12, back to processor 12. Using time TMEAS, processor 12 calculates the distance to the object using the formula: Distance=ToF×c/2=TMEAS×c/2, where c is the speed of light and ToF is time of flight of the transmitted signal to and from transceiver 14.

Depending on the material makeup of target object 16, the reflected portion will have a much lower amplitude than when it was transmitted. At close range, a relatively strong feedthrough signal between the transmitter and receiver can overpower the lower amplitude reflected portion, blinding the receiver and making the range, or distance, determination difficult. The blind range is at least dependent on the width of the transmitted pulse. This pulse width is dependent on the bandwidth of the system. More specifically, the pulse width is approximately 5 to 6 ns (nanoseconds) for a typical IR_UWB pulse. One nanosecond corresponds to approximately 30 centimeters, so the blind range for the feedthrough pulse is approximately 1.5 to 2 meters for the IR-UWB radar.

Figure 2:
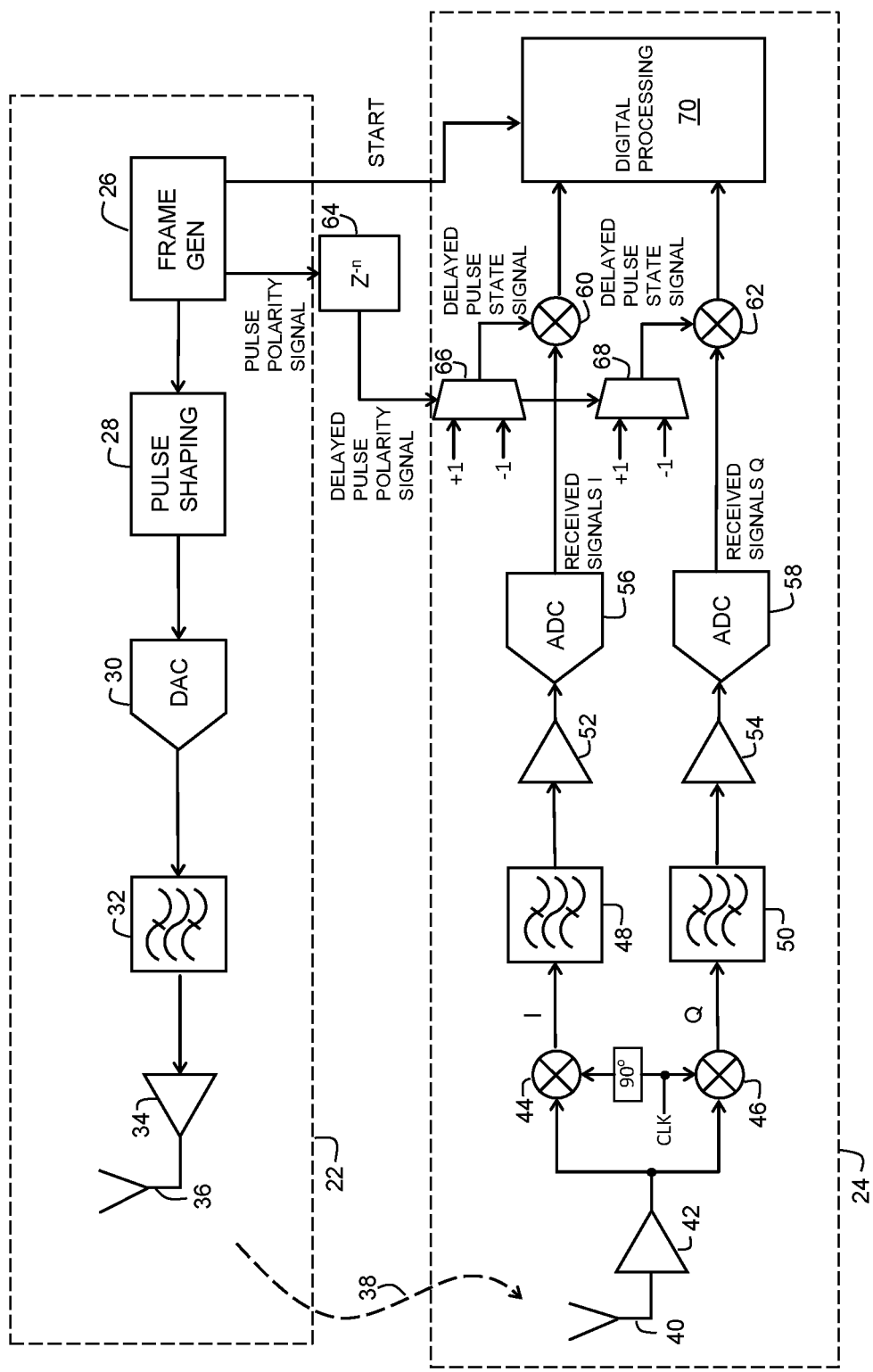
FIG. 2 illustrates a transceiver in accordance with an embodiment.

FIG. 2 illustrates transceiver 20 in accordance with an embodiment. Transceiver 20 includes a transmitter 22 and a receiver 24. Transmitter 22 includes frame generation block 26, pulse shaping block 28, digital-to-analog converter (DAC) 30, filter 32, amplifier 34 and antenna 36. Receiver 24 includes antenna 40, amplifier 42, mixers 44 and 46, lowpass filters 48 and 50, amplifiers 52 and 54, analog-to-digital converters (ADCs) 52 and 54, multipliers 60 and 62, multiplexers 66 and 68, and digital processing block 70.

In transmitter 22, frame generator block 26 generates frames of localization pulse sequences for transmission. In one embodiment, the frames are generated in accordance with the IEEE 802.15.4z standard. In another embodiment, the frames may be generated in according to another technique or standard. The pulses to be transmitted are a combination of positive and negative pulses in a predetermined sequence. The pulses are provided through pulse shaping block 28 to an input of DAC 30. DAC 30 converts the digital pulses to analog pulses and provides the pulses to filter 32. Filter 32 low pass filters the sequence of pulses. Amplifier 34 amplifies the pulses for transmission from antenna 36. When the transmitted sequence of pulses hit a target object, some of the energy of the pulses is reflected back to transceiver 20, where the reflected pulses are received at antenna 40 of receiver 24.

In receiver 24, amplifier 42 amplifies the received reflected pulses and provides the pulses to I and Q quadrature channels. The received signal is split between the I and Q channels using mixers 44 and 46 and a clock signal (CLK), where the signals in the I channel is 90 degrees shifted from the Q channel. The I channel includes mixer 44, filter 48, amplifier 52, ADC 56 and multiplier 60. The Q channel includes mixer 46, filter 50, amplifier 54, ADC 58, and multiplier 62. The I and Q channels process the received signal and ADCs 56 and 58 convert the analog received signals I and Q to digital received signals (RECEIVED SIGNALS I and RECEIVED SIGNALS Q). The digital received signals I and Q are provided to digital processing 70 where the received pulses are processed according to predetermined parameters. Digital processing 70 may be implemented using a digital signal processor (DSP), or another suitable processor.

Feedthrough portion 38 is coupled between transmitter 22 and receiver 24. The undesired feedthrough portion between transmitter 22 and receiver 24 may be the result of a coupled path between the antennas or through, e.g., a printed circuit board (PCB) implementation of transceiver 20. Feedthrough portion 38 is generally stronger than the reflected portion and hence occupies most of the dynamic range of receiver 24.

For ranging, or distance measuring, transmitter 22 transmits short impulses with a time interval between two adjacent pulses known as a pulse repetition interval (PRI). This PRI information is known to receiver 24. Receiver 24 accumulates every PRI over several repetitions to obtain a channel impulse response (CIR) calculated in digital processing block 70. This CIR is then processed to detect and measure the distance and velocity of target objects. The CIR obtained through accumulation will include the reflected portion as well as feedthrough portion 38. In one embodiment, the goal is to remove, or at least reduce feedthrough portion 38 in the CIR so the detection of reflected weak portion is improved.

In order to cancel feedthrough portion 38 using the described embodiment, it is necessary that the pulse sequence transmitted by transmitter 22 be a known pulse sequence. Let the pulse sequence be represented as $C_i$ with sequence length N and index i. The pulse sequence should satisfy the following two properties:

$$C_1 + \Sigma_{i=2}^{N} C_i * C_i * C_{i-1} = 0 \qquad 1)$$

$$\Sigma_{i=1}^{N} C_i = 0$$

Generally, the first property says that multiplication of the transmitted sequence of pulses multiplied by a delayed version of the transmitted sequence of pulses should equal zero. The second property says that the transmitted sequence should have an equal number of positive and negative pulses. Complying with these two properties in the pulse sequence ensures the proper alignment of the pulse polarity signal with the received signals so feedthrough portion 38 is cancelled out. A pulse sequence is then generated which will effectively cancel out the feedthrough path while constructively adding up reflections.

To cancel feedthrough portion 38, information about the polarity of the transmitted pulse is passed from the digital portion of transmitter 22 to the digital part of receiver 24. The pulse polarity signal indicates the polarity of the pulse that is being transmitted, that is, whether the transmitted signal is a positive one (+1) or negative one (−1).

Figure 3:
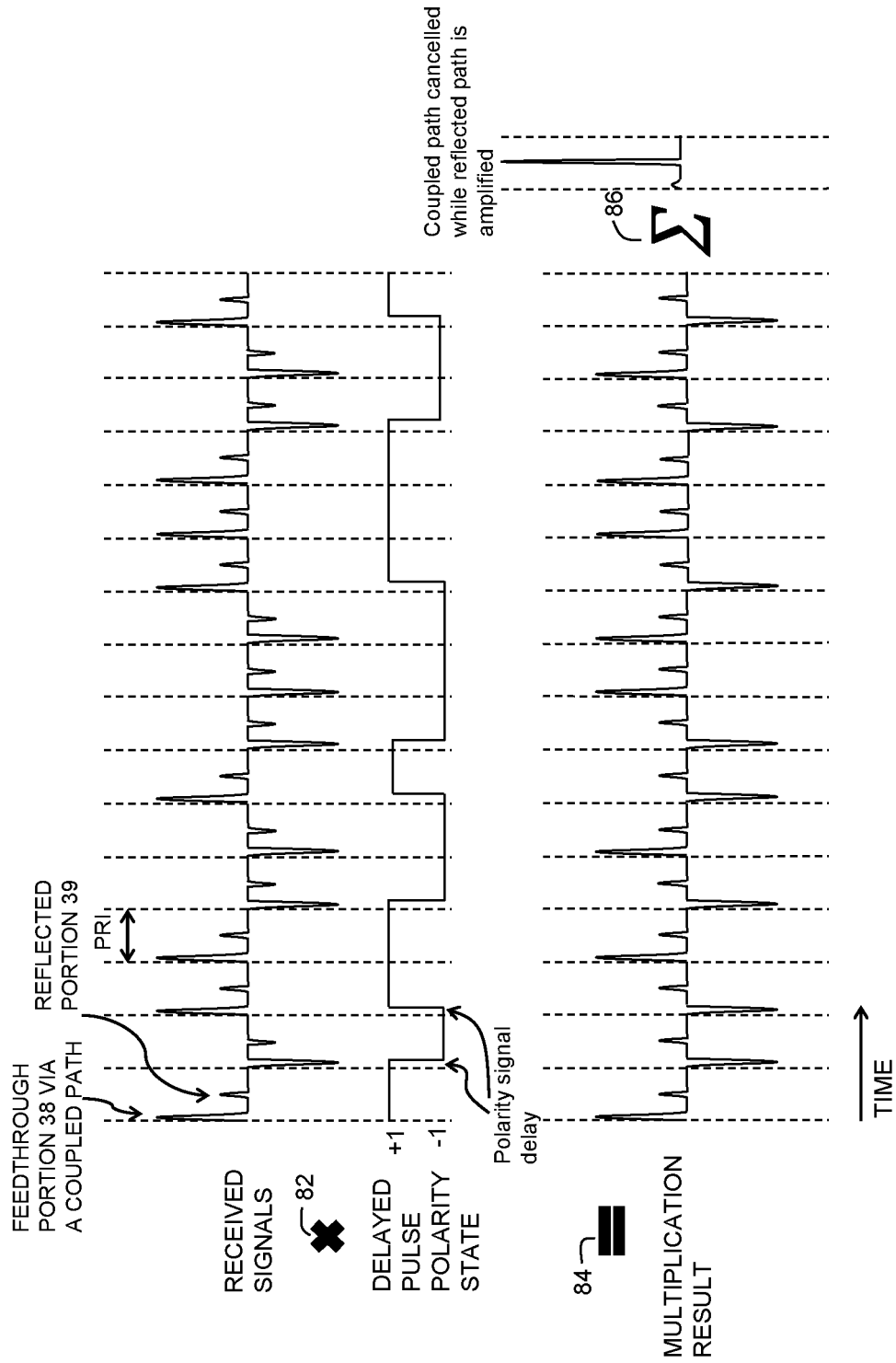
FIG. 3 illustrates waveforms for suppressing the feedthrough portion in the transceiver of FIG. 2.

In one embodiment, the pulse polarity provided to delay element 64 is a single bit signal and is generated from the sequence information constructed during frame generation. In another embodiment, the pulse polarity signal may be different. Digital delay element 64 adds a delay to the pulse polarity signal before it is used in the digital portion of receiver 24. The delay provided by delay block 64 is programmable, or selectable, in one embodiment. The delay added to the pulse polarity signal is such that, in time, a pulse polarity signal from a previous PRI overlaps, or extends into a next adjacent, latter in time, PRI so that just the feedthrough portion of the next transmitted pulse and not the reflected portion of the received portion in the next PRI is overlapped (see FIG. 3). In FIG. 3, time progresses from left to right. The delay can be measured from a PRI boundary to a rising or falling edge of the pulse polarity signal as illustrated in FIG. 3. The programmable delay is determined for a range of pulse widths and may also include a propagation delay from transmitter 22 to receiver 24. Note that delay element 64 can be implemented with either transmitter 22 or receiver 24.

In the illustrated embodiment, the pulse polarity signal is a single bit for providing logic one and logic zero states. The pulse polarity signal is provided to multiplexers 66 and 68 through delay element 64. The delayed pulse polarity signal is used as a control signal to select either the +1 input or the −1 input of multiplexers 66 and 68. As mentioned above, the delay causes a previous received pulse polarity state to be paired with a current, or next adjacent in time pulse polarity state, received pulse for multiplication. The output of multiplexer 66 is provided to an input of multiplier 60, and the output of multiplexer 68 is provided to multiplier 62. Multipliers 60 and 62 multiply the selected positive and negative pulses with the received signals. The multiplication result is then accumulated in digital processing 70 as part of the CIR. The multiplication cancels most or all the feedthrough signal while amplifying the reflected signal. Note that the use of multiplexers 66 and 68 illustrates just one embodiment for implementing the presently illustrated embodiment. Other embodiments may be different.

FIG. 3 illustrates waveforms for suppressing feedthrough portion 38 in transceiver 20 of FIG. 2. The waveforms in FIG. 3 are divided into pulse repetition intervals (PRI) using vertical dashed lines. Within each PRI is a positive or negative feedthrough portion 38 and a reflected portion 39 of a signal received by receiver 24, where feedthrough portion 38 is a pulse having a much greater amplitude than reflected portion 39. In FIG. 3, the received portions are multiplied 82 with the delayed pulse polarity state signal provided by multiplexers 66 and 68. The pulse polarity state signals are a plurality of positive one (+1) states and negative one (−1) states that are representative of the transmitted pulses generated in transmitter 22.

In FIG. 3, the pulse polarity signal is delayed and provided to receiver 24. Both the feedthrough portion 38 and the reflected portion 39 are multiplied by the delayed pulse polarity state signal. However, the delay time period is selected so that, for each PRI, only the next in time feedthrough portion is multiplied by the previous in time pulse polarity signal without the reflected portion being covered by the delay of the pulse polarity signal. The current reflected portion is multiplied with the pulse polarity signal without the delay. Also, the delay should cover the entire feedthrough portion in each PRI. This delay is illustrated in FIG. 3 by being extended across the PRI boundaries to include only the whole feedthrough portion and not the reflected portion. An example sequence is provided to show how the pulse polarity state signal is used to cancel out feedthrough portion 38. As shown in FIG. 3, an example sequence which follows the two properties discussed above is C={1,−1,1,1,−1,−1,1,−1,−1,−1,1,1,1,−1,−1,1}. This example sequence is multiplied (82) with the pulse polarity signal and equals (84) a multiplication result. After multiplication 82, the multiplication result is accumulated 86 in digital processing 70 resulting in most or all the feedthrough portion 38 being canceled while reflected portion 39 is amplified. The accumulation may occur in digital processing 70 when binning and CIR is performed. Although FIG. 3 shows a single reflected path, there could be multiple reflected paths and all of them can be constructively accumulated and hence amplified. Note that the example sequence is just one example and there may be many sequences that satisfy the two properties set out above.

Removing the feedthrough portion as described enables detection of targets within a very short range, which may not otherwise be possible due to the high amplitude feedthrough portion also occupying the detection range. Removing the feedthrough portion also assists with further processing by reducing the dynamic ranges of the resulting CIR as reflected paths are generally much lower in amplitude compared to the feedthrough portion.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for radar ranging, the method comprising:
   transmitting, by a transmitter of a transceiver, a signal having a first predetermined sequence of positive and negative pulses;
   receiving, by a receiver of the transceiver, a reflected portion of the transmitted signal from an object;
   receiving, by the receiver, a feedthrough portion of the transmitted signal via a coupled path between the transmitter and the receiver;
   providing a pulse polarity signal from the transmitter to the receiver, the pulse polarity signal representative of the predetermined sequence of positive and negative states for indicating the polarity of each transmitted pulse of the transmitted signal;
   delaying the pulse polarity signal by a predetermined delay to provide a delayed pulse polarity signal to the receiver;
   using the delayed pulse polarity signal to provide a delayed sequence of positive and negative pulse polarity states;
   multiplying each pulse polarity state in the delayed sequence of pulse polarity states with a pulse corresponding pulse of the feedthrough portion of the transmitted signal to produce a multiplication result having a plurality of positive and negative pulses, wherein the delay of the delayed pulse polarity signal shifts each multiplication into a next pulse repetition interval (PRI); and
   accumulating the positive and negative pulses of the multiplication result, wherein the predetermined sequence of the positive and negative pulses is predetermined to suppress the feedthrough ranging signal received via the coupled path.

2. The method of claim 1, wherein the predetermined sequence of positive and negative pulses of the transmitted signal have an equal number of positive and negative pulses.

3. The method of claim 1, wherein delaying the pulse polarity signal by a predetermined delay further comprises delaying the pulse polarity signal by a time period determined so that a state of the delayed pulse polarity state signal is multiplied with only the feedthrough portion of a next transmitted pulse.

4. The method of claim 3, wherein the delay is determined to include each whole pulse of the feedthrough portion of the transmitted signal without including the reflected portion.

5. The method of claim 1, wherein the transceiver is an impulse radio ultra-wideband (IR-UWB) radar frequency transceiver used for ranging.

6. The method of claim 1, wherein the reflected portion of the transmitted signal is received within a time period when the transmitted signal is still being transmitted by the transmitter.

7. The method of claim 1, wherein accumulating the positive and negative pulses of the multiplication result cancels the feedthrough ranging signal as viewed in a channel impulse response of the received feedthrough portion and the reflected portion of the transmitted signal.

8. The method of claim 7, wherein accumulating the positive and negative pulses of the feedthrough portion of the ranging signal occurs during binning.

9. The method of claim 1, wherein the delayed pulse polarity state signal is a digital signal and is provided to select the positive and negative pulses.

10. In an impulse radio ultra-wideband (IR-UWB) radar transceiver having a transmitter and a receiver, a method for radar ranging, the method comprising:

transmitting, by the transmitter, a ranging signal having a predetermined sequence of positive and negative pulses;

receiving, by the receiver, a received signal having a reflected portion of the ranging signal and a feedthrough portion of the ranging signal, wherein the feedthrough portion is received via a coupled path between the transmitter and the receiver;

providing a pulse polarity state signal to the receiver, the pulse polarity state signal representative of the transmitted ranging signal, the pulse polarity state signal;

multiplying each current pulse in the predetermined sequence of the feedthrough portion of the ranging signal with a previous state of the pulse polarity state signal to produce a multiplication result having a plurality of positive and negative pulses; and accumulating the positive and negative pulses of the multiplication result, wherein the transmitted sequence of positive and negative pulses comprises an equal number of positive and negative pulses that are predetermined to suppress the feedthrough ranging signal received via the coupled path.

11. The method of claim 10, wherein the ranging signal is divided into a plurality of pulse repetition intervals (PRI), wherein each pulse of the predetermined sequence of positive and negative pulses occupies one PRI, and wherein the previous state is in a PRI prior to the current pulse.

12. The method of claim 10, wherein delaying the pulse polarity state signal by a predetermined delay further comprises delaying the pulse polarity signal by a time period determined so that a state of the delayed pulse polarity state signal is multiplied with only the feedthrough portion of a next transmitted pulse.

13. The method of claim 12, wherein the delay is determined to include each whole pulse of the feedthrough portion of the ranging signal without including the reflected portion.

14. The method of claim 10, wherein the reflected portion of the ranging signal is received within a time period when the ranging signal is still being transmitted by the transmitter.

15. The method of claim 10, wherein accumulating the positive and negative pulses of the multiplication result suppresses the feedthrough portion of the ranging signal as viewed in a channel impulse response of the received feedthrough portion and reflected portion of the transmitted signal.

16. The method of claim 10, wherein the delayed pulse polarity signal is a digital signal and is provided to select the positive and negative pulses.

* * * * *